US005278349A

United States Patent [19]

[11] Patent Number: 5,278,349

Mutoh et al.

[45] Date of Patent: Jan. 11, 1994

[54] METHOD OF CONTROLLING MUSICAL TONE GENERATION CHANNELS IN AN ELECTRONIC MUSICAL INSTRUMENT

[75] Inventors: Takaaki Mutoh; Toshifumi Kunimoto, both of Hamamatsu, Japan

[73] Assignee: Yamaha Corporation, Hamamatsu, Japan

[21] Appl. No.: 798,570

[22] Filed: Nov. 26, 1991

[30] Foreign Application Priority Data

Nov. 29, 1990 [JP] Japan .................................. 2-325387

[51] Int. Cl.[5] .......................... G10H 5/00; H04Q 1/18

[52] U.S. Cl. .......................................... 84/653; 84/664

[58] Field of Search ................. 84/615, 618, 631, 653, 84/656, 664, 678, 684, DIG. 4, DIG. 27

[56] References Cited

U.S. PATENT DOCUMENTS

Re. 32,838 1/1989 Suzuki .
4,041,826 8/1977 Oya .
4,590,838 5/1986 Kashio .
4,703,680 11/1987 Wachi et al. .......................... 84/615
4,773,294 9/1988 Iizuka et al. ...................... 84/615 X
4,957,552 9/1990 Iwase .................................... 84/622
5,095,800 3/1992 Matsuda ............................... 84/618
5,099,741 3/1992 Komatsu et al. ....................... 84/653
5,119,710 6/1992 Tsumuri et al. ....................... 84/615
5,206,446 4/1993 Matsumoto et al. .................. 84/624

*Primary Examiner*—William M. Shoop, Jr.
*Assistant Examiner*—Jeffrey W. Donels
*Attorney, Agent, or Firm*—Graham & James

[57] ABSTRACT

An apparatus for controlling a musical tone in an electronic musical instrument which has a plurality of keys and a plurality of tone generation channels, the apparatus includes a detecting device for detecting a depression state of the plurality of keys, a counter for counting number of key which are simultaneously depressed when key depression is detected, an assigning device for assigning predetermined number of the tone generation channels to each of depressed keys so as to substantially stabilize number of entire assigned generation channels, in accordance with a counted value of the counter, a loudspeaker for generating tone signal from the predetermined number of tone generation channels assigned by the assigning device. In the apparatus, even if the number of keys to be depressed is changed, the number of tones to be simultaneously produced is not greatly changed.

18 Claims, 8 Drawing Sheets

| KEY DEPRESSION COUNT | TONE GENERATION FORMAT | | | | | | | |
|---|---|---|---|---|---|---|---|---|
| 1 | 4 | | | | | | | |
| 2 | 2 | 2 | | | | | | |
| 3 | 2 | 2 | 2 | | | | | |
| 4 | 2 | 2 | 2 | 2 | | | | |
| 5 | 2 | 2 | 2 | 1 | 1 | | | |
| 6 | 2 | 2 | 1 | 1 | 1 | 1 | | |
| 7 | 2 | 1 | 1 | 1 | 1 | 1 | 1 | |
| 8 OR MORE | 1 | 1 | 1 | 1 | 1 | 1 | 1 | 1 |

| KEY DEPRESSION COUNT | TONE GENERATION FORMAT | | | | | | | |
|---|---|---|---|---|---|---|---|---|
| 1 | 4 | | | | | | | |
| 2 | 2 | 2 | | | | | | |
| 3 | 2 | 2 | 2 | | | | | |
| 4 | 2 | 2 | 2 | 2 | | | | |
| 5 | 2 | 2 | 2 | 1 | 1 | | | |
| 6 | 2 | 2 | 1 | 1 | 1 | 1 | | |
| 7 | 2 | 1 | 1 | 1 | 1 | 1 | 1 | |
| 8 OR MORE | 1 | 1 | 1 | 1 | 1 | 1 | 1 | 1 |

METHOD OF CONTROLLING MUSICAL TONE GENERATION CHANNELS IN AN ELECTRONIC MUSICAL INSTRUMENT

BACKGROUND OF THE INVENTION

The present invention relates to a method of controlling a musical tone in an electronic musical instrument and, more particularly, to a method of controlling musical tones for an ensemble simulation in which a plurality of tone generation channels are assigned to depression of one key and a plurality of musical tones are simultaneously produced.

A conventional electronic musical instrument can simultaneously produce a plurality of tones upon depression of each key to obtain an ensemble effect as described in U.S. Pat. No. 4,590,838.

In a conventional electronic musical instrument, since the number of tones to be produced in correspondence with depression of one key is predetermined as fixed data, the number of tones to be simultaneously produced greatly varies depending on the number of depressed keys. An ensemble effect obtained upon depression of a large number of keys is different from that obtained upon depression of a small number of keys. As a result, a sufficiently effective ensemble effect cannot be obtained.

SUMMARY OF THE INVENTION

It is an object of the present invention to provide a method and apparatus for controlling a musical tone in an electronic musical instrument, wherein even if the number of keys to be depressed is changed, the number of tones to be simultaneously produced is not greatly changed.

It is another object of the present invention to provide a method and apparatus for controlling a musical tone in an electronic musical instrument, wherein an audibly natural ensemble effect can be obtained.

It is still another object of the present invention to provide a method and apparatus for controlling a musical tone in an electronic musical instrument, wherein a sufficiently effective ensemble effect can be obtained even if the number of depressed keys is small.

In order to achieve the above objects according to an aspect of the present invention, there is provided a method of controlling a musical tone in an electronic musical instrument which has a plurality of keys and a plurality of tone generation channels, the comprising the steps of depressing a desired key of the plurality of keys, counting number of keys which are simultaneously depressed, assigning a predetermined number of tone generation channels to the respective depressed keys so as to substantially stabilize number of entire assigned generation channels in accordance with a counted value, and generating tone generating signals from assigned tone generation channels.

In order to achieve the above objects according to another aspect of the present invention, there is provided an apparatus for controlling a musical tone in an electronic musical instrument which has a plurality of keys and a plurality of tone generation channels, the apparatus comprising detecting means for detecting a depression state of the plurality of keys, counting means for counting number of key which is depressed when key depression is detected by the detecting means, assigning means for assigning predetermined number of the tone generation channels to each of depressed keys so as to substantially stabilize number of entire assigned generation channels, in accordance with a counted value of the counting means, and generating means for generating tone signal from the predetermined number of tone generation channels assigned by the assigning means.

DESCRIPTION OF THE PREFERRED EMBODIMENTS

Figures 1, 2:
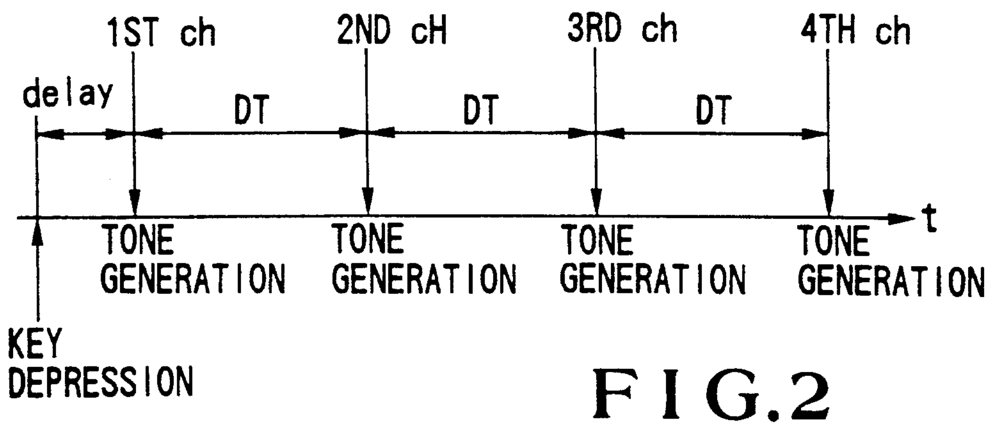
FIG. 1 is a table showing assignment of tone generation channels according to a method of the present invention.
FIG. 2 is a timing chart showing simultaneous tone generation timings of a plurality of channels according to the method of the present invention.

An example of assignment of tone generation channels according to a method of the present invention is shown in FIG. 1. A sound source is an 8-channels source (i.e., a maximum of eight musical tones can be simultaneously produced). Depression of the first key (i.e., a key depression count: 1) is assigned with four channels. Depression of the second key (i.e., a key depression count: 2) is assigned with two of the remaining four channels. Depression up to the fourth key (i.e., a key depression count: 4) is assigned with two channels. When the fourth key is depressed, two channels are assigned to each depressed key from the fourth key.

When the fifth key is depressed (i.e., a key depression count: 5), all the eight channels have already been used, and the tone generation channels become insufficient. From the fifth key, one of the already assigned channels of the first to fourth keys is deleted. The deleted channel is then assigned to a key from the fifth key. In this manner, every time the key depression count is incremented by one, one of the already assigned channels is deleted, and the deleted channel is assigned to a newly depressed key. Therefore, when the eighth key is depressed (i.e., a key depression count: 8), the eight channels are assigned to all the eight keys, respectively.

As described above, the number of tone generation channels assigned to each key is variably changed in accordance with the key depression counts. Even if the number of depressed keys is changed, the total number of tones to be produced is not greatly changed. Therefore, an audibly natural ensemble effect can be obtained.

If tones produced by a plurality of tone generation channels assigned to a given key or keys have different tone generation timings, the tones almost simultaneously produced provide a voluminous, spreading ensemble effect. For example, as shown in FIG. 2, predetermined delay amounts DT are given between the four tone generation channels (ch) assigned to one depressed key, and tones from the respective tone generation channels are preferably produced with small time lags. With this arrangement, the rise times of the respective musical instruments in the ensemble can be controlled. In addition, phase shifts between the respective musical instruments can be realized as phase shifts between the respective sound sources.

Preferred embodiments of the present invention will be described in detail with reference to the accompanying drawings.

Figure 3:
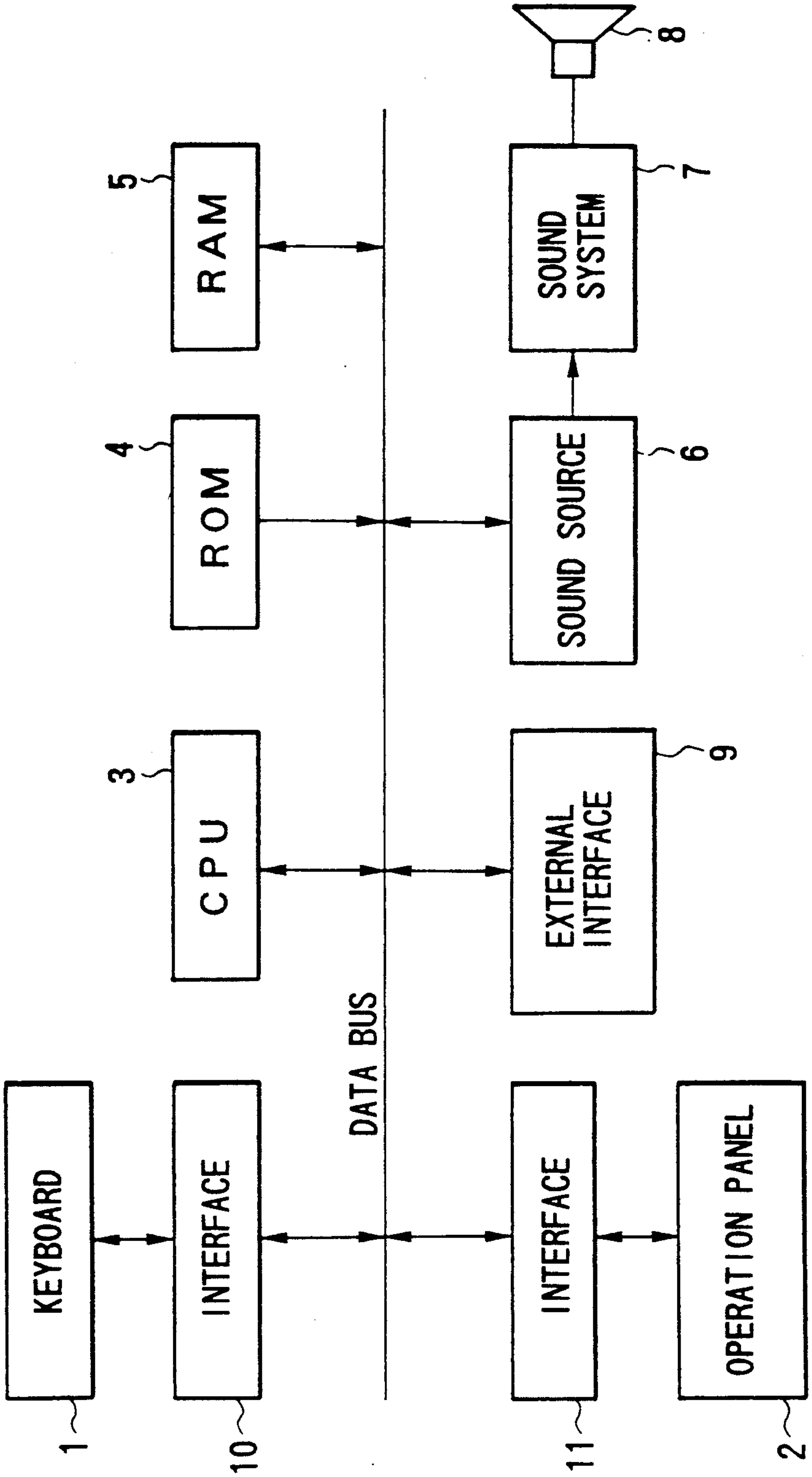
FIG. 3 is a block diagram showing an embodiment according to the present invention.

FIG. 3 is a block diagram of an electronic musical instrument according to an embodiment of the present invention. Reference numeral 1 denotes a keyboard; 2, an operation panel for setting a tone color, a volume level, and other various parameters; 3, a processor (CPU); 4, a read-only memory (ROM) for storing various programs for generating and controlling musical tone signals in the electronic musical instrument; 5, a random access memory (RAM); 6, a sound source for generating and outputting necessary musical tone signals; 7, a sound system for amplifying a musical tone signal output from the sound source 6 and providing a sound effect; 8, a loudspeaker; 9, an external interface such as an MIDI; and 10 and 11, interfaces for the keyboard 1 and the operation panel 2.

In this embodiment, the sound source 6 is an 8-channels (chs) sound source which can simultaneously produce a maximum of eight tones. Processing programs to be described below are stored in the ROM 4.

An operation of this embodiment will be described with reference to flow charts.

A general flow of this embodiment will be described with reference to a main processing routine in FIG. 4.

When processing is started, initialization is performed (step S401). Key scanning is performed (steps S402 and S403). When key depression (key ON: KON) or key release (key OFF: KOFF) is detected during key scanning, tone generation processing (step S404) is performed under the control of the CPU 3. Panel scanning is then performed (steps S405 and S406). When parameter updating of the operation panel 2 is detected during panel scanning, panel processing corresponding to this updating is performed (step S407).

The above processing operations are repeated at high speed to realize a musical performance with musical tones in the electronic musical instrument.

Figure 4:
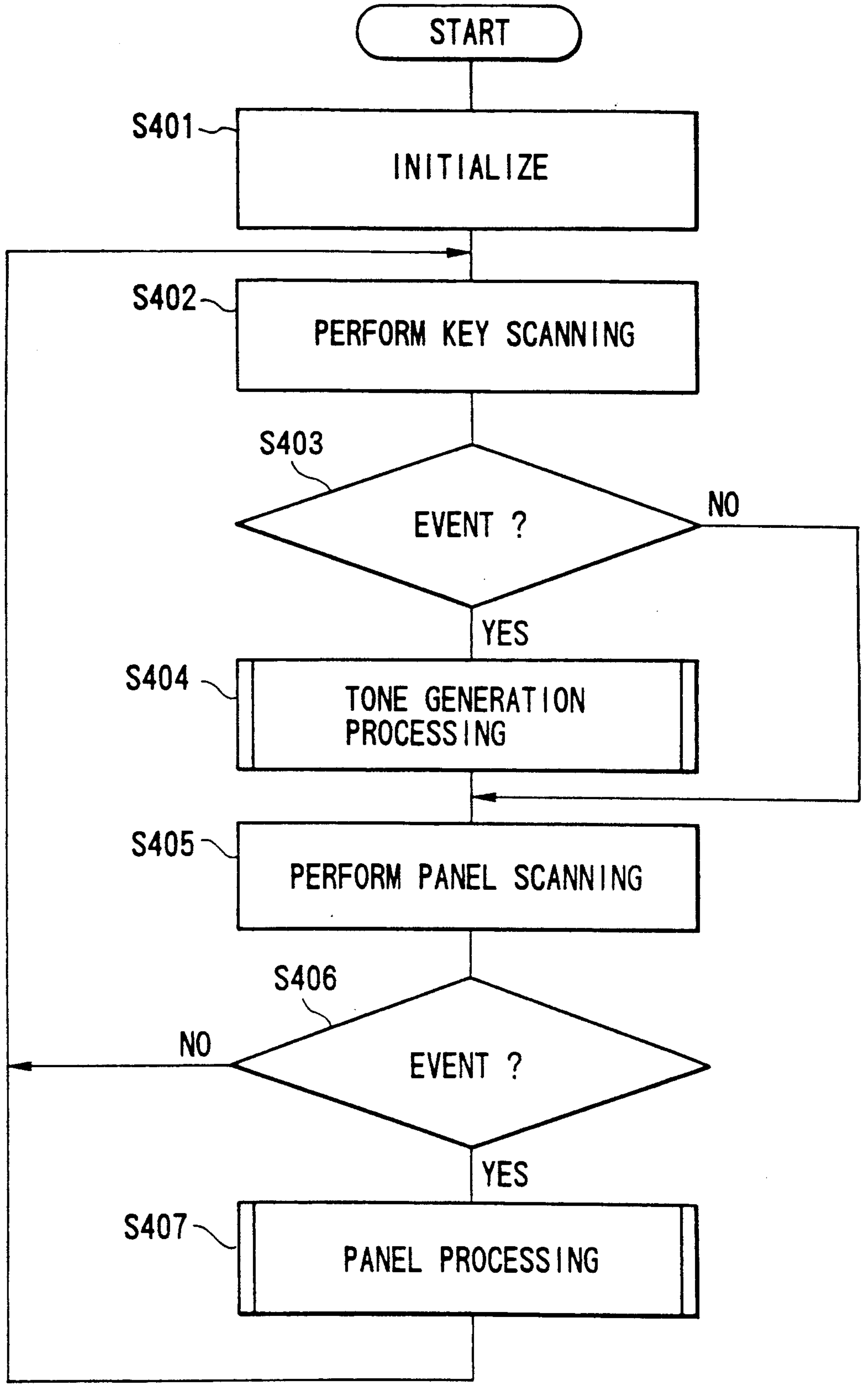
FIG. 4 is a flow chart showing a main processing routine of the embodiment shown in FIG. 3.
Figure 5:
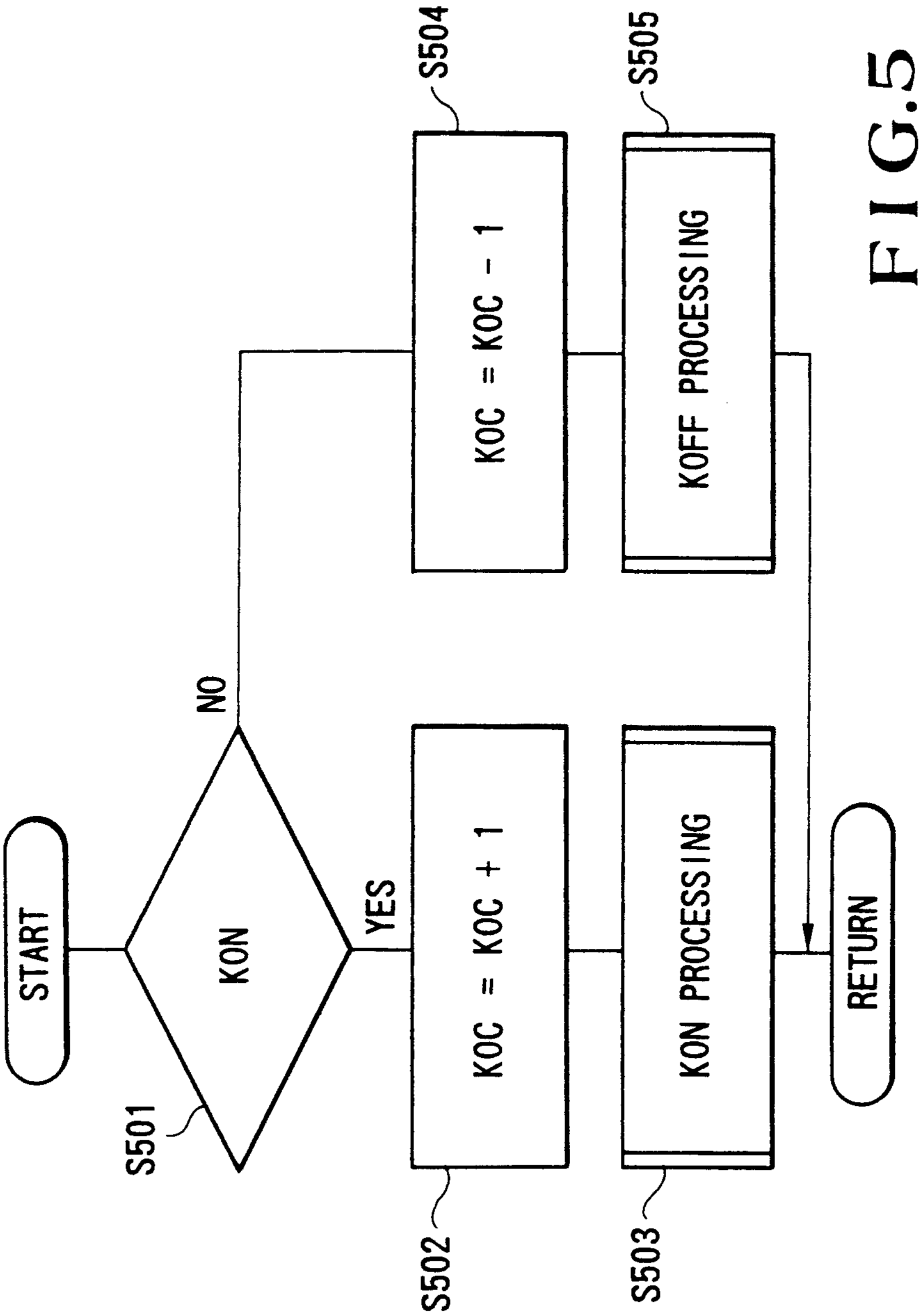
FIG. 5 is a flow chart showing a tone generation processing routine of the embodiment shown in FIG. 3.

FIG. 5 is a detailed flow chart of the tone generation processing routine (step S404) in FIG. 4. During key scanning of the main processing routine, when a key ON state (KON) of the keyboard 1 is detected (step S501), a key ON count value KOC representing the number of currently ON keys is incremented by one, and the incremented key count is stored (step S502). KON (Key ON) processing to be described in detail later is then performed (step S503). When a key OFF state (KOFF) of the keyboard 1, however, is detected, the key ON count value KOC representing the number of currently ON keys is decremented by one. The decremented count is stored (step S504), and KOFF processing to be described in detail later is performed (step S505).

The present invention is characterized by the KON processing routine (step S503) and the KOFF processing routine (step S505) in the flow chart of FIG. 5. Assignment of tone generation channels corresponding to the key depression count and control of simultaneous tone generation timings of the tone generation channels, both of which are objects of the present invention, are realized by the above processing routines.

Figure 6:
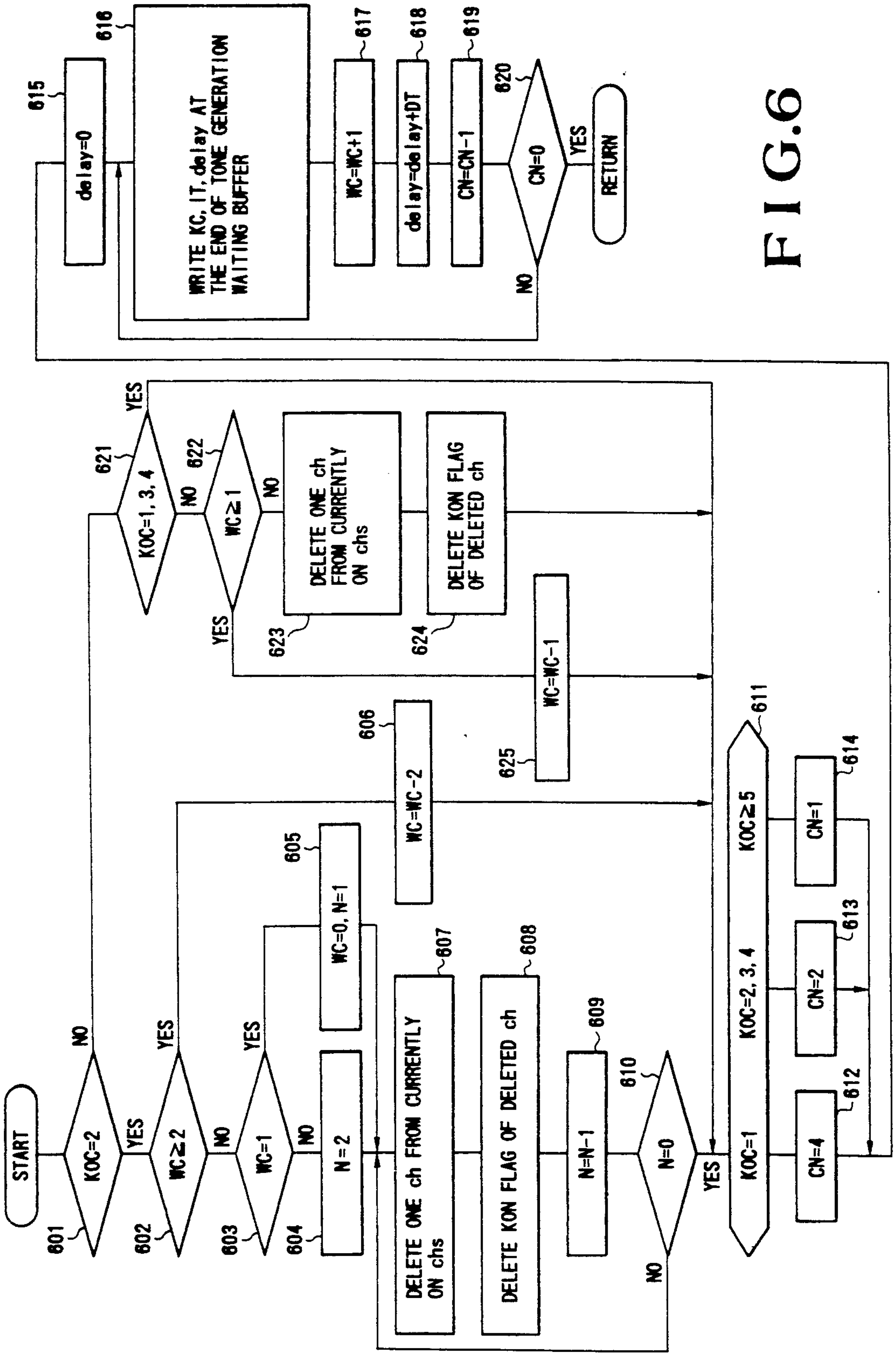
FIG. 6 is a flow chart showing a KON processing routine of the embodiment shown in FIG. 3.
Figure 7:
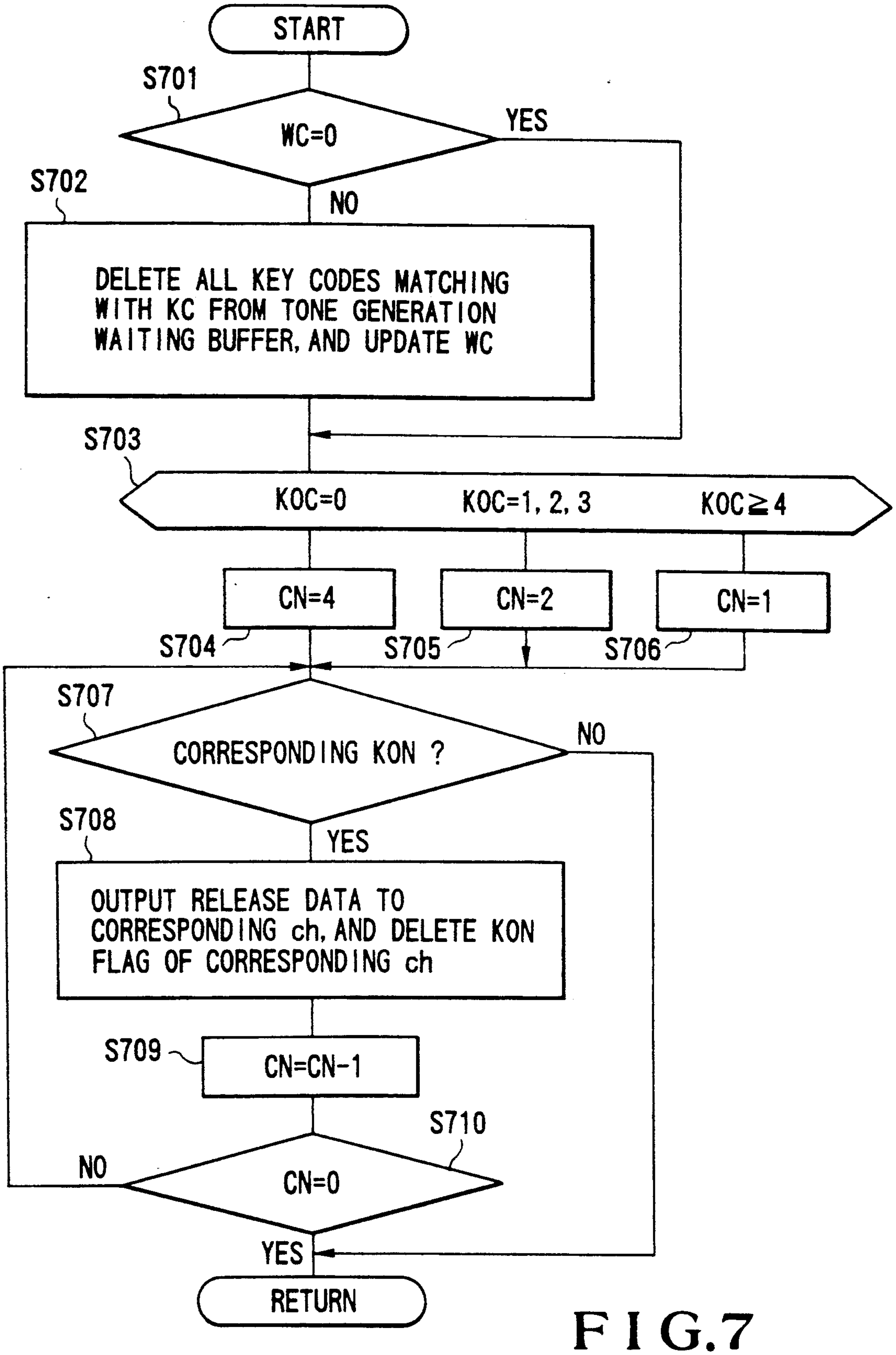
FIG. 7 is a flow chart showing a KOFF processing routine of the embodiment shown in FIG. 3.

The KON and KOFF processing routines are shown in detail in FIGS. 6 and 7, respectively. The KON processing routine in FIG. 6 is a routine performed when the key depression count is increased by a key ON operation, and the KOFF processing routine in FIG. 7 is a routine performed when the key depression count is decreased by a key OFF operation.

The KON processing routine in FIG. 6 will be described below.

The general flow of the processing of the KON processing routine in FIG. 6 will be briefly described below. Steps S601 to S614 and steps S621 to S625 are parts for assigning tone generation channels in FIG. 1 when the key depression count is increased. Steps S615 to S620 constitute a part for giving the predetermined delay amounts DT between the simultaneous tone generation channels shown in FIG. 2. The processing operations in FIG. 6 will be described in order.

When processing is started, it is determined in step S601 whether a key ON count value KOC becomes 2, i.e., whether the key depression count of the keyboard 1 becomes 2. The key ON count value KOC=2 is determined due to the following reason. As is apparent from FIG. 1, when the key depression count is changed from one to two, two of the four tone generation channels assigned to the depression of the first key must be deleted. When the key ON count value is given as KOC=2, the flow advances to step S602. However, if the key ON count value is not KOC=2, then the flow advances to step S621.

As shown in FIG. 1, if the key depression count is 1, four tone generation channels are assigned to the depression of the first key, and the small delay amounts DT are assigned to these four tone generation channels, as shown in FIG. 2, thereby almost simultaneously producing the tones. This delay amount DT falls within the range of 20 to 30 ms. The delay amount need not be fixed to a specific value within this range, but can be set variable in accordance with a random number. For this reason, when the second key is depressed, the channels assigned to the depression of the first key may include a channel from which a tone is not generated. If at least two channels of the channels assigned to the depression of the first key do not produce tones, and if the second key is depressed, these two unused channels are deleted. The two deleted channels are preferably assigned to depression of the second key.

When the assigned channels have different tone colors such as tone colors of a piano, a flute, a violin, and the like, an order of tone generation timing may be predetermined at random or in accordance with the types of musical instruments.

It is then determined in step S602 whether a tone generation waiting channel count WC is two or more. If the number of unused channels is two or more, the flow advances to step S606. Two out of the unused channels are deleted, and the flow advances to step S611. When the tone generation waiting channel count is larger than the delete channel count, the priority of deletion is determined in accordance with an order of smaller channel numbers or the types of musical instruments. If the tone generation waiting channel count WC is smaller than two, the flow advances to step S603 to determine whether the tone generation waiting channel count WC is 1 or 0.

If the tone generation waiting channel count WC is one in step 603, the number of unused channels is only one. This channel is deleted. In addition, one of the three ON channels must be deleted. If the tone generation waiting channel count WC=1, then the flow advances to step S605. The remaining unused tone generation channel is deleted from a tone generation waiting buffer to set the tone generation waiting channel count WC=0. At the same time, a channel delete count N representing a channel to be deleted from the ON channels is set to 1.

In step S603, when the tone generation waiting channel count WC is zero, it indicates that the four tone generation channels assigned to the depression of the first key are ON. Two out of the four ON channels must be deleted. When the tone generation waiting channel count WC=0 is satisfied, the flow advances to step S604 to set the channel delete count N to 2.

As described above, when the channel delete count N=1 or 2 is set from the ON channels, the flow advances to loop processing of steps S607 to S610, thereby deleting the tone generation channel or channels.

If the channel delete count N=1 is satisfied, processing of steps S607 to S610 is performed once in accordance with the determination of steps S609 and S610. One of the three ON channels which simultaneously produce tones upon depression of the first key is selected and deleted. A KON (key ON) flag of the deleted tone generation channel is reset to 0. If the channel delete count N=2 is satisfied, processing of steps S607 to S610 is repeated twice in accordance with the determination of steps S609 and S610. Two of the four ON channels which simultaneously produce tones upon depression of the first key are selected and deleted. KON (key ON) flags of the two deleted tone generation channels are reset to 0. The order of deletion of the tone generation channels is determined in accordance with an order of channels for tone generation signals having smaller envelope amplitudes at the time of deletion, an order of channels having longer tone generation durations from the start of tone generation, or an order satisfying any other conditions.

In step S601, if the key ON count value KOC=2 is not satisfied, the flow advances to step S621.

The key ON count value KOC is determined in step S621. If the key ON count value KOC=1, 3, or 4 is satisfied, the tone generation delete processing is not required, as is apparent from FIG. 1. In this case, the flow advances to step S611. If the key ON count value KOC=1, 3, or 4 is not satisfied in step S621, i.e., if the key ON count value KOC≧5 is satisfied, the flow advances to step S622. One of the currently ON channels is deleted (steps S623 and S624) in accordance with the presence/absence (WC≧1) of the current tone generation waiting channel count WC. Alternatively, one of the tone generation waiting channels is deleted (step S625). Delete processing of one channel for the key depression count≧5 in FIG. 1 is performed.

When tone generation channel delete processing is completed, the flow advances to step S611. In steps S611 to S614, a channel assignment count CN for a newly depressed key is automatically determined in accordance with the key ON count value KOC, i.e., the current key depression count.

If the key ON count value KOC=1 is satisfied in step S611, it indicates that a state corresponding to a key depression count of 0 is changed to a state corresponding to a key depression count of 1. The channel assignment count CN for the newly depressed key is set to be CN=4 (S612). Therefore, four channels are assigned to depression of the first key.

When the key ON count value KOC=2, 3, or 4, depression of the second, third, or fourth key is indicated. A channel assignment count CN for depression of a new key is set to be CN=2 (S613). Therefore, two channels are assigned to the newly depressed key.

When the key ON count value KOC=2, i.e., when the second key is depressed, two out of the four channels assigned to the first key must be deleted. Delete processing of the two channels is already performed in steps S601 to S610, thus posing no problems.

If the key ON count value KOC≧5 is satisfied, the channel assignment count CN for a newly depressed key is set to be CN=1 (S614). Each channel is assigned to each newly depressed key.

As a result of channel assignment processing in steps S611 to S614, tone generation channel assignment shown in FIG. 1 is realized.

In step S615, tone generation rise times "delay" between a plurality of tone generation channels assigned to the newly depressed key are set to zero. In step S616, a key code KC, initial touch information IT, and the tone generation rise time information "delay" of the newly depressed key are written at an end portion of the tone generation waiting buffer in the RAM 5. In step S617, the tone generation waiting channel count WC is incremented by one, and the incremented value is stored. In step S618, the predetermined delay amount DT is added to the tone generation rise time "delay" to set a tone generation rise time "delay".

The operations in steps S616 to S620 are repeated by steps S619 and S620 until the channel assignment count CN set in steps S612, S613, or S614 becomes zero.

Upon completion of the loop processing of steps S616 to S620, channels represented by the channel assignment count CN assigned to the newly depressed key are stored as tone generation waiting channels in the tone generation waiting buffer in the RAM 5. For example, assume that the first key is depressed. The channel assignment count CN for the depression of the first key is set to be CN=4 in step S612. The loop processing of steps S616 to S620 is repeated four times, and the four tone generation channels continuously assigned at the tone generation timings shown in FIG. 2 are written as the tone generation waiting channels at the end of the waiting buffer in the RAM 5.

The KOFF processing routine in FIG. 7 will be described below.

The general flow of the KOFF processing routine in FIG. 7 will be briefly described below. Steps S701 to S706 constitute a part for assigning the tone generation channel count corresponding the key depression count of FIG. 1 when the key depression count is decreased. Steps S707 to S710 constitute a part for stopping tone generation of the tone generation channels corresponding to an OFF key. The operations in FIG. 7 will be described in order.

When a key OFF (key release) state is detected, it is determined in step S701 whether a tone generation waiting channel count WC at present is zero. If tone generation operations for all depressed keys are completed and the tone generation waiting channel count WC=0 is satisfied, the flow advances to step S703.

If the tone generation waiting channel count WC≠0, i.e., if any tone generation waiting channel is present, the flow advances to step S702, information associated with a tone generation waiting channel matching with a key code of the OFF key is searched from the tone generation waiting buffer in the RAM 5. All pieces of information associated with tone generation waiting channels having key codes matching with the key code of the OFF key are deleted. The tone generation waiting channel count WC is decremented by an amount corresponding to the number of deleted channels. When the tone generation waiting channel is deleted and thus an empty space is formed in the buffer, the tone generation waiting channel after the deleted tone generation waiting channels is shifted forward not to form the empty space in the buffer.

In step S703, the key ON count value KOC measured upon key OFF operation of the key is determined, and the delete channel count CN is set in accordance with the determined key ON count value KOC.

More specifically, if the key ON count value KOC=0, the number of currently ON keys is zero. A maximum of four tones must be muted for the next key release. As shown in FIG. 1, when the number of currently depressed keys is decreased from two to one, a maximum of two tones must be muted. The term "maximum" indicates that there may be a channel already deleted without tone generation in steps S701 and S702, and a key (the key depression count is decreased from two to one) for generating two tones upon each depression of this key. In steps S704 to S706, a maximum value of the number of channels to be deleted in correspondence with the current key ON count value KOC is set as the delete channel count CN.

In steps S703 to S706, after the channel assignment count CN for the newly depressed key upon detection of a key OFF operation is set, tone generation of an ON channel assigned to the OFF key is stopped due to the following reason. Since a channel which has already sent tone generation information to the sound source 6 before detecting KOFF continues tone generation, the tone generation operation of this channel must be stopped after detecting KOFF.

It is determined in step S707 whether a key ON channel is included in tone generation channels corresponding to the OFF key. If any ON channel is not present, processing is ended. However, if an ON channel is present, release data for stopping tone generation is sent to this ON tone generation channel. The KON flag of this tone generation channel is deleted, thereby stopping tone generation of this ON tone generation channel.

The tone generation stop processing in steps S707 to S710 is repeated a maximum of CN times until the corresponding tone generation channels become absent.

As described, tone generation channel assignment and tone generation stop processing in the key OFF state have been performed.

Figure 8:
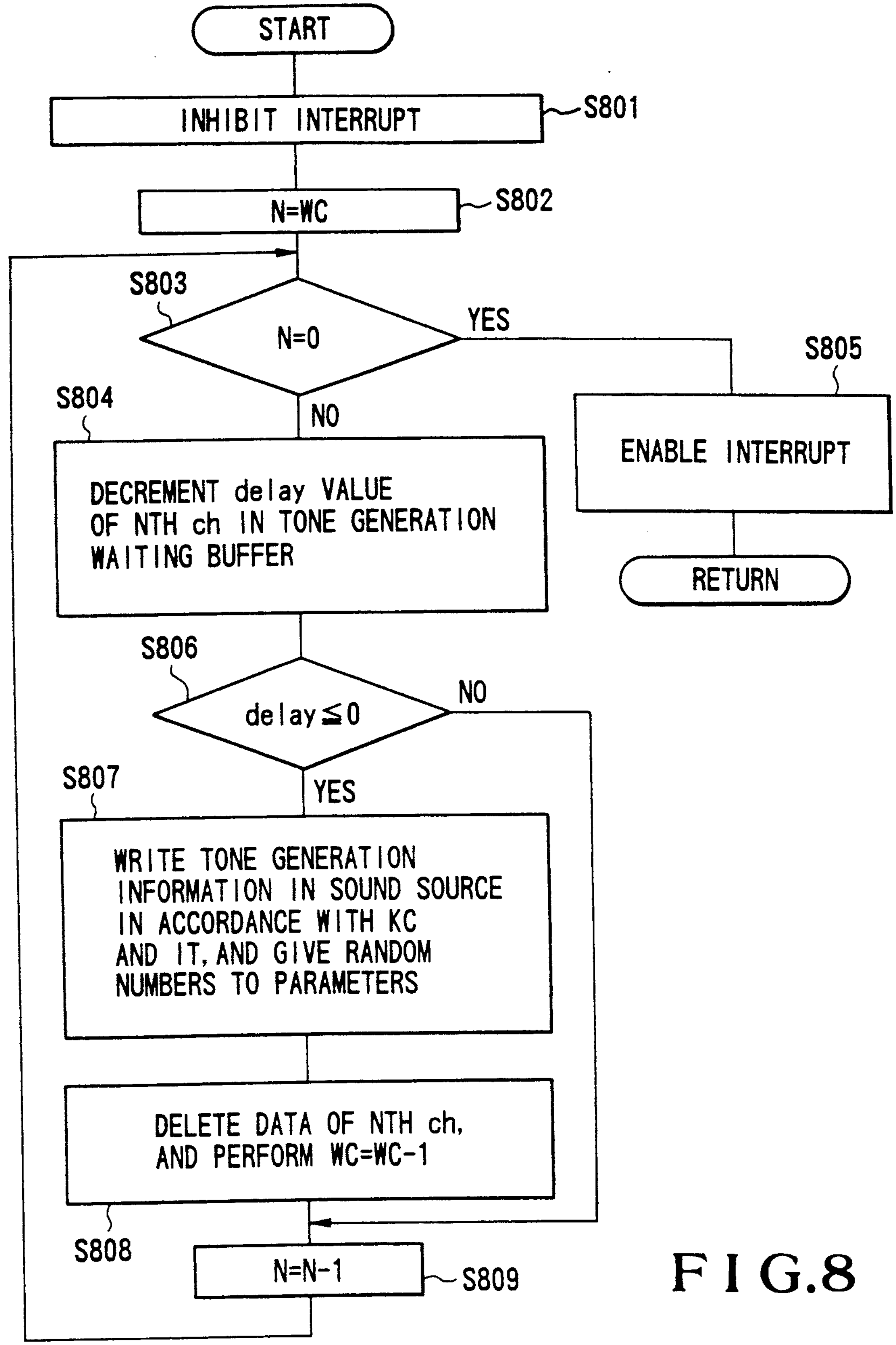
FIG. 8 is a flow chart showing an interrupt processing routine of the embodiment shown in FIG. 3.

The tone generation information of the generation waiting channel such as the key code KC, the initial touch information IT, and the tone generation rise time information "delay" stored in the tone generation waiting buffer in the RAM 5 is sent to the sound source 8 in the interrupt processing of FIG. 8 with reference to the tone generation rise time information "delay" of each channel at a timing when each tone generation channel generates a tone, thereby generating a musical tone signal in the sound source 6.

The interrupt processing routine in FIG. 8 will be described below. In step 801, interrupt inhibit processing is performed to prevent from occurring an interrupt recall (i.e., another interrupt is generated during execution of the interrupt processing program).

In step S802, the tone generation waiting channel count WC is loaded in a general register in the CPU 3, so that register value N is set to be N=WC.

It is determined in step S803 whether the register value N=0 is established, i.e., whether any tone generation waiting channel is present. If NO in step S803, musical tone generation is unnecessary. In step S805, an interrupt is allowed again, and the interrupt processing returns to the previous processing routine.

On the other hand, in step S803, if the register value N is given as N≠0, i.e., if any tone generation waiting channel is present, the flow advances to step S804, and tone generation information of the tone generation waiting channel at the tone generation timing is sent to the sound source 6 by the loop processing of steps S804 to S809.

In the loop processing of steps S804 to S809, tone generation waiting channels stored in the tone generation waiting buffer are sequentially searched from the end of the buffer. The tone generation rise time information "delay" of each channel is decremented in step S804. It is then determined in step S806 whether delay≦0 is established.

If YES in step S806, the tone generation waiting channel determines that its tone generation time is ON. In step S807, the key code KC and the initial touch information IT of this tone generation waiting channel stored in the tone generation waiting buffer are output and stored in the sound source 6. The corresponding tone generation channel in the sound source 6 generates a musical tone signal having a pitch represented by the written key code KC and a strength corresponding to the written initial touch information IT. The musical tone signal is then output to the sound system 7. A musical tone is produced from the loudspeaker 8. At this time, in step S807, a pitch bend parameter and an envelope parameter of the musical tone are modulated with random numbers to obtain an ensemble effect.

Data of the tone generation waiting channel is deleted from the tone generation waiting buffer upon completion of tone generation information output, and the tone generation waiting channel count WC is decremented by one in step S808.

When the deleted channel is stored at the end of the tone generation waiting buffer, the data is deleted and the tone generation channel count WC is updated. However, when the deleted channel is stored at an intermediate portion of the tone generation channel data array, the subsequent tone generation waiting channels are shifted forward by an amount of deleted data. In this manner, even if the tone generation waiting channel storage positions are shifted forward, no problem occurs because the tone generation waiting channels in the buffer are referred from the end of the buffer, as is apparent in steps S804 and S809.

The present invention has been described with the particular embodiment described above. The sound source 6 used in the present invention may be obtained in accordance with a frequency modulation scheme, a waveform memory scheme, or a scheme for synthesizing a musical tone by simulating tone generation algorithms of acoustic musical instruments.

In step S807 in FIG. 8, when the pitch bend parameter and the envelope parameter are to be modulated, the change width of the parameters, their variation ranges, and their distribution states are controlled to obtain a delicate ensemble effect.

The parameters are not limited to the pitch bend and envelope parameters. Parameters such as a tone color and a volume level may be changed between the channels. In the above description, the number of assigned channels is determined on the basis of the table in FIG. 1. However, the assignment channel count can be arbitrarily set.

Figure 9:
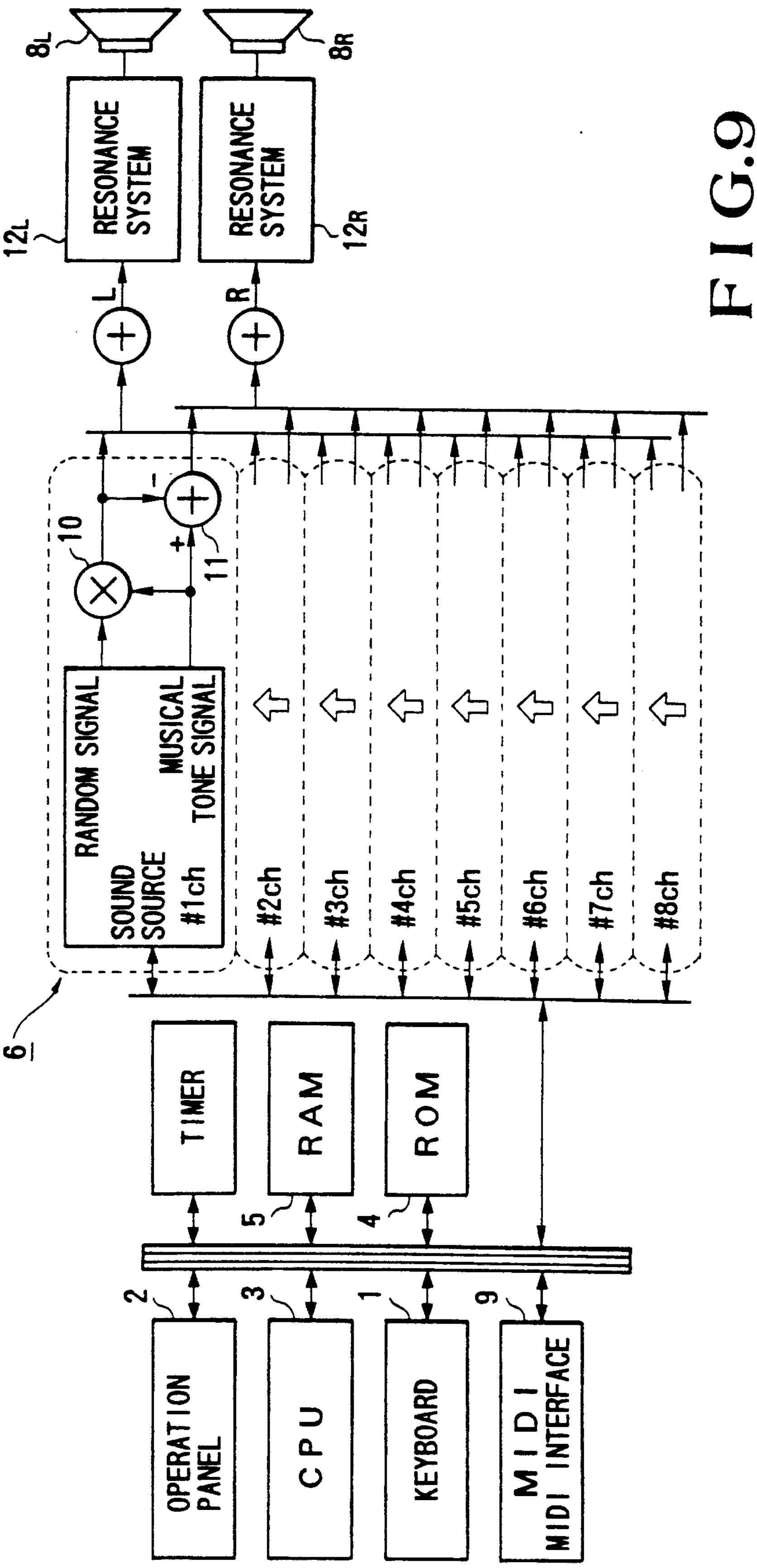
FIG. 9 is a block diagram showing another embodiment according to the present invention.

FIG. 9 shows another embodiment of the present invention.

The same reference numerals as in FIG. 3 denote the same functions in this embodiment, and a detailed description thereof will be omitted. A timer is used to control a system as in interrupt processing.

In this embodiment, a sound source 6 comprises an 8-channels (#1ch to #8ch) sound source, a musical tone signal and a random signal are output in units of channels, and L (left) and R (right) musical tone signals are generated from one musical tone signal by a multiplier 10 and an adder 11 arranged in units of channels. The L and R musical tone signals output from each channel are synthesized every L or R channels. The L and R musical tone signals are independently produced from left and right loudspeakers $8_L$ and $8_R$ through resonance systems $12_L$ and $12_R$, respectively. These resonance systems $12_L$ and $12_R$ provide resonance effects to output signals. Tone generation assignment processing is performed for the eight channels #1ch to #8ch in accordance with the musical tone control method of the present invention described above.

As is apparent from the above description, according to the musical tone control method of the present invention, the number of tone generation channels to be assigned to each key is variably changed in accordance with the key depression counts. Even if the key depression count is changed, the number of tones almost simultaneously produced is not greatly changed. Therefore, an audibly natural ensemble effect can be obtained.

What is claimed is:

1. A method of controlling musical tone generation in an electronic musical instrument having a plurality of keys and a plurality of tone generation channels, said method comprising the steps of:

detecting depression of keys;

setting, in an automated fashion, a simultaneous tone generation number for each of said keys which are simultaneously in a depressed condition, at least one of said simultaneously depressed keys having a number set corresponding to at least two channels of said plurality of tine generation channels when a number of said keys which are in said depressed condition is less than said plurality of tone generation channels;

assigning a number of said plurality of tone generation channels to each of said simultaneously depressed keys according to said simultaneous tone generation number for that depressed key;

assigning not information of each of said simultaneously depressed keys to said assigned musical tone generation channels for that depressed key; and generating musical tone signals according to said assigned note information.

2. A method according to claim 1, wherein the number of musical tone generation channels assigned to at least one simultaneously depressed key is decreased as a number of simultaneously depressed keys is increased from a predetermined value.

3. A method according to claim 1, wherein the number of tone generation channels assigned to at least one simultaneously depressed key is increased as a number of simultaneously depressed keys is decreased from a predetermined value.

4. A method according to claim 1, wherein the number of musical tone generation channels assigned to each of said simultaneously depressed keys is set at a minimum value when a number of said simultaneously depressed keys is a maximum value corresponding to said plurality of tone generation channels.

5. A method according to claim 1, wherein each of said tone signals generated according to said note information of a particular depressed key having a different start time.

6. A method according to claim 5, wherein the tone generation start timings of the plurality of tone generation channels are spaced at equal intervals obtained by a sequentially delaying tone generation start timings of the respective tone generation channels by predetermined delays times.

7. A method according to claim 5 wherein upon depression of a subsequent key during tone generation based upon depression of a preceding key, the assignment of at least one unused channel of the plurality of tone generation channels assigned to the depression of the preceding key is canceled.

8. A method according to claim 7, wherein a number of tone generation channels whose assignment is to be canceled is a value obtained by subtracting the number of tone generation channels assigned to the depression of the subsequently depressed key from the number of tone generation channels assigned to the depression of the preceding key.

9. A method according to claim 8, wherein when the number of unused channels is smaller by a shortage amount than the number of tone generation channels whose assignment is to be canceled, the assignment of the unused tone generation channels are canceled, and at the same time, a number of tone generation channels corresponding to the shortage amount are selected from all currently operating tone generation channels and are disabled.

10. A method according to claim 9, wherein an order of disabling currently operating tone generation channels is in order of channels generating tone signals having smaller envelope amplitudes.

11. A method according to claim 9, wherein an order of disabling currently operating tone generation channels is in order of channels having longer tone generation durations from the start of tone generation.

12. A method according to claim 7 including the step of detecting key release, wherein when an unused tone generation channel corresponding to a released key upon detection of key release is present, all unused tone generation channels assigned to said released key are canceled in their assignment.

13. A method according to claim 7 including the step of detecting key release, wherein when a currently operating tone generation channel corresponding to a released key upon detection of kcy release is present, all currently operating tone generation channels stop tone generation.

14. A method according to claim 1, wherein each of said assigned tone generation channels independently generates a left musical tone and a right musical tone for each said musical tone signal.

15. An apparatus for controlling a musical tone generation in an electronic musical instrument having a plurality of keys and a plurality of tone generation channels, said apparatus comprising:

detecting means for detecting depression states of the plurality of keys;

means for determining a number of detected keys which are simultaneously in a depressed state as detected by said detecting means;

means for assigning a number of said plurality of tone generation channels to each of said simultaneously depressed keys according to a simultaneous tone generation number for each depressed key, at least one of said simultaneously depressed keys being assigned to at least two channels of said plurality of tone generation channels when said determined number of said simultaneously depressed keys is less than said plurality of tone generation channels;

means for assigning note information of each of said simultaneously depressed keys to said assigned tone generation channels for that depressed key; and generating means for generating tone signals according to said assigned note information.

16. An apparatus according to claim 15, wherein said means for generating said tone signals includes delay means for slightly shifting tone generation start timings of respective mutual tones corresponding to depression of each key, and for almost simultaneously producing musical tones.

17. A method according to claim 1, further comprising the step of determining a tone generation channel to be cancelled in its assignment from among said previously assigned tone generation channels, wherein said determining is based on a change in said number of said simultaneously depressed keys.

18. The apparatus according to claim 15, further comprising means for determining a number of said tone generation channels assigned to one of said simultaneously depressed keys to be cancelled in their assignment, and means for re-assigning said cancelled musical tone generation channels to a subsequently depressed key.

* * * * *